Figure 1:
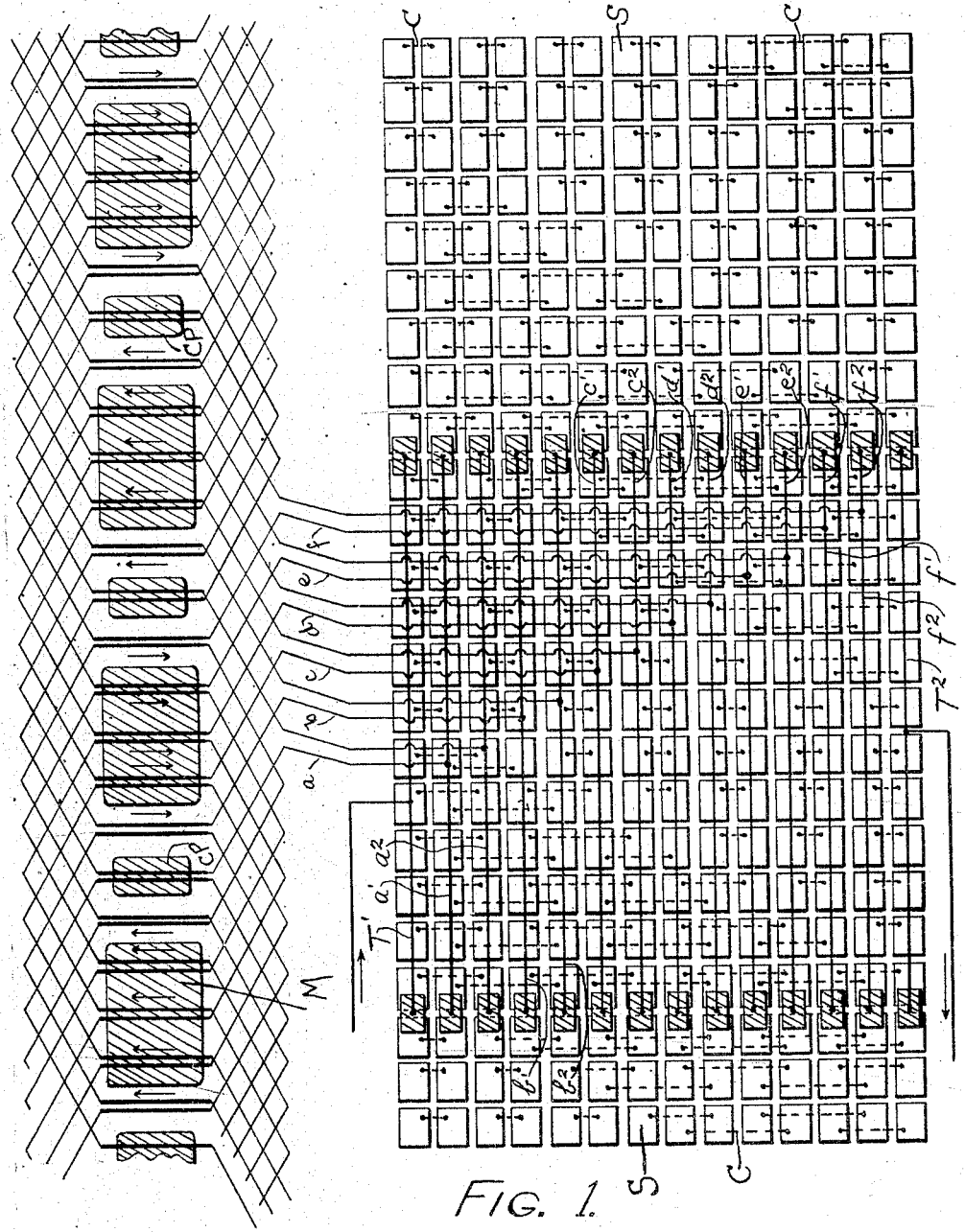

C. W. GIRVIN.
DIRECT CURRENT MACHINE.
APPLICATION FILED MAY 14, 1913.
1,139,203.
Patented May 11, 1915.
3 SHEETS—SHEET 3.
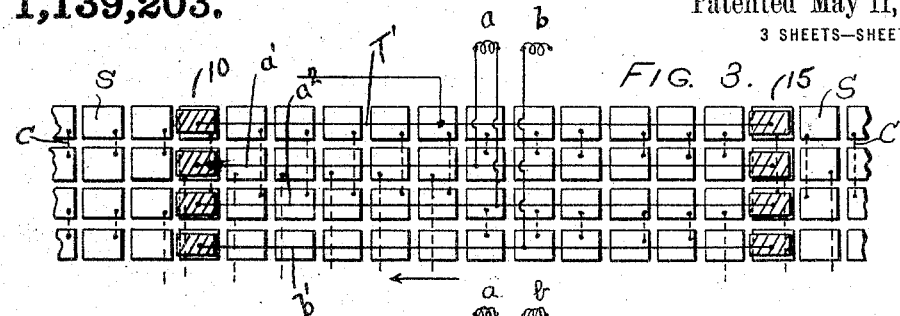
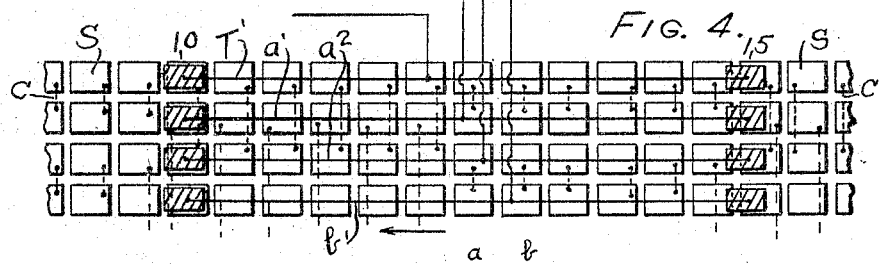
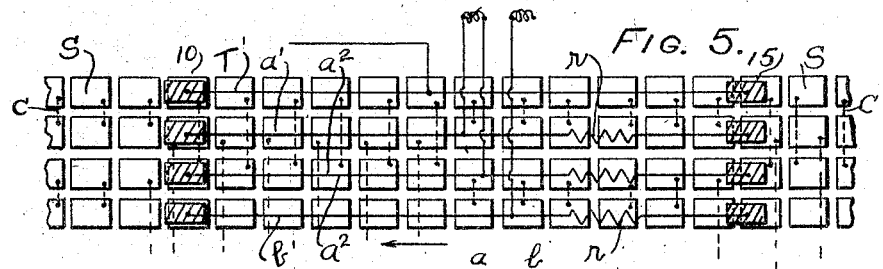
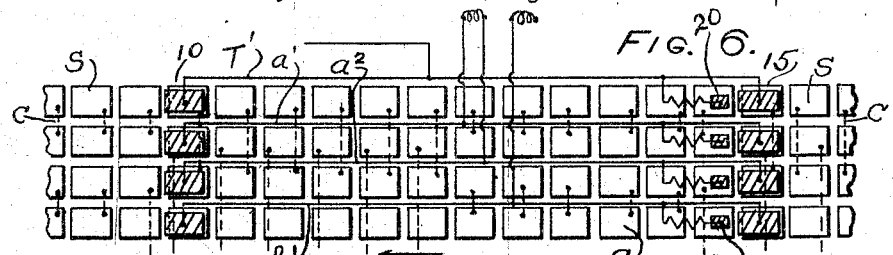
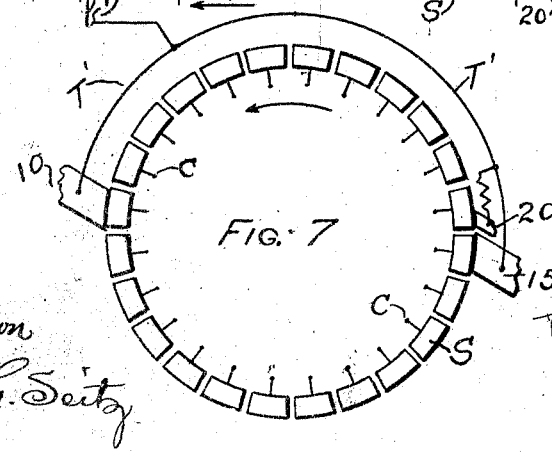
WITNESSES
INVENTOR
ATTORNEY

UNITED STATES PATENT OFFICE.

CHARLES W. GIRVIN, OF SAN FRANCISCO, CALIFORNIA, ASSIGNOR TO GIRVIN ELECTRICAL DEVELOPMENT COMPANY, LIMITED, OF HONOLULU, TERRITORY OF HAWAII, A CORPORATION OF THE TERRITORY OF HAWAII.

DIRECT-CURRENT MACHINE.

1,139,203.  Specification of Letters Patent.  Patented May 11, 1915.

Application filed May 14, 1913. Serial No. 767,725.

*To all whom it may concern:*

Be it known that I, CHARLES W. GIRVIN, a citizen of the United States, and residing at San Francisco, in the county of San Francisco and State of California, have invented certain new and useful Improvements in Direct-Current Machines, of which the following is a specification.

This invention relates to improvements in direct current machines, viz. machines for generating or employing direct or continuous currents, and more particularly to machines dealing with continuous currents of relatively high potential.

The present invention is a carrying forward of the general idea disclosed in my application filed March 11, 1912, Serial No. 683,065, which general idea involves the use of open-circuit armature coil units maintained constantly in series relationship through a commutator, the latter also maintaining the units constantly in circuit, each unit being commutated individually. The general arrangement for providing this result disclosed in said prior application is that of a stationary armature and rotating field magnet which may be along the lines of a polyphase alternating current synchronous generator or motor, the windings or coil-units having their terminals in the form of brushes adapted to coöperate with circumferential rows of segments on the commutator, these segments being also arranged approximately in longitudinal rows, the connections between segments extending generally longitudinally of the commutator. This arrangement of segments and their connections is more fully pointed out in my companion application filed May 12, 1913, Serial No. 767,060, but it may be noted that the arrangement is such that the connections leading from segments adapted to coöperate with the brushes of a coil unit are changed in synchronism with the reversal of the E. M. F. of that coil unit, succeeding segments of the circumferential rows having substantially the same connections until the next reversal takes place, these connections being so arranged that the alternations in direction of E. M. F. in the coil units are rectified to provide a unidirectional terminal E. M. F. The disclosure in said prior application provided for various ways in which the current capacity of the machine may be regulated, as by forming the coil units of a plurality of conductors connected in series, parallel, or combination of both, or by connecting the terminals of predetermined numbers of coil units in series, parallel, or a combination of both, the coil units, in the latter type, being arranged in groups, the coil units of each group, however, having their terminal brushes coöperating with the commutator and its segment connections so as to provide the maintenance of the constant series and closed circuit conditions.

The present invention embodies the general idea above indicated, but is designed more particularly to meet conditions where the desired current capacity is of such a size as to render it difficult to provide the necessary contact area of brushes and segments without unduly enlarging the size of the commutator, especially where each coil unit has individual terminal brushes and but one group is used. And where a plurality of groups is employed, each coil unit of each group having individual terminal brushes, a larger number of leads from the armature is required. These facts do not impair the efficiency of the machine in operation, any disadvantage that might appear being more particularly in connection with the structural designing. The present invention is designed to meet conditions where these disadvantages in structural design may be of importance, the present structure embodying features of both types in that the number of groups is limited, thus decreasing the number of leads, and at the same time retaining the relatively small dimensions of the commutator by employing a plurality of brushes for each terminal of the coil unit.

Another object is to provide means for assisting commutation. To these and other ends, the nature of which will be readily understood as the invention is hereinafter disclosed, said invention consists in the improved construction and combination of parts hereinafter described, illustrated in the accompanying drawings and more particularly pointed out in the appended claims.

Figure 2:
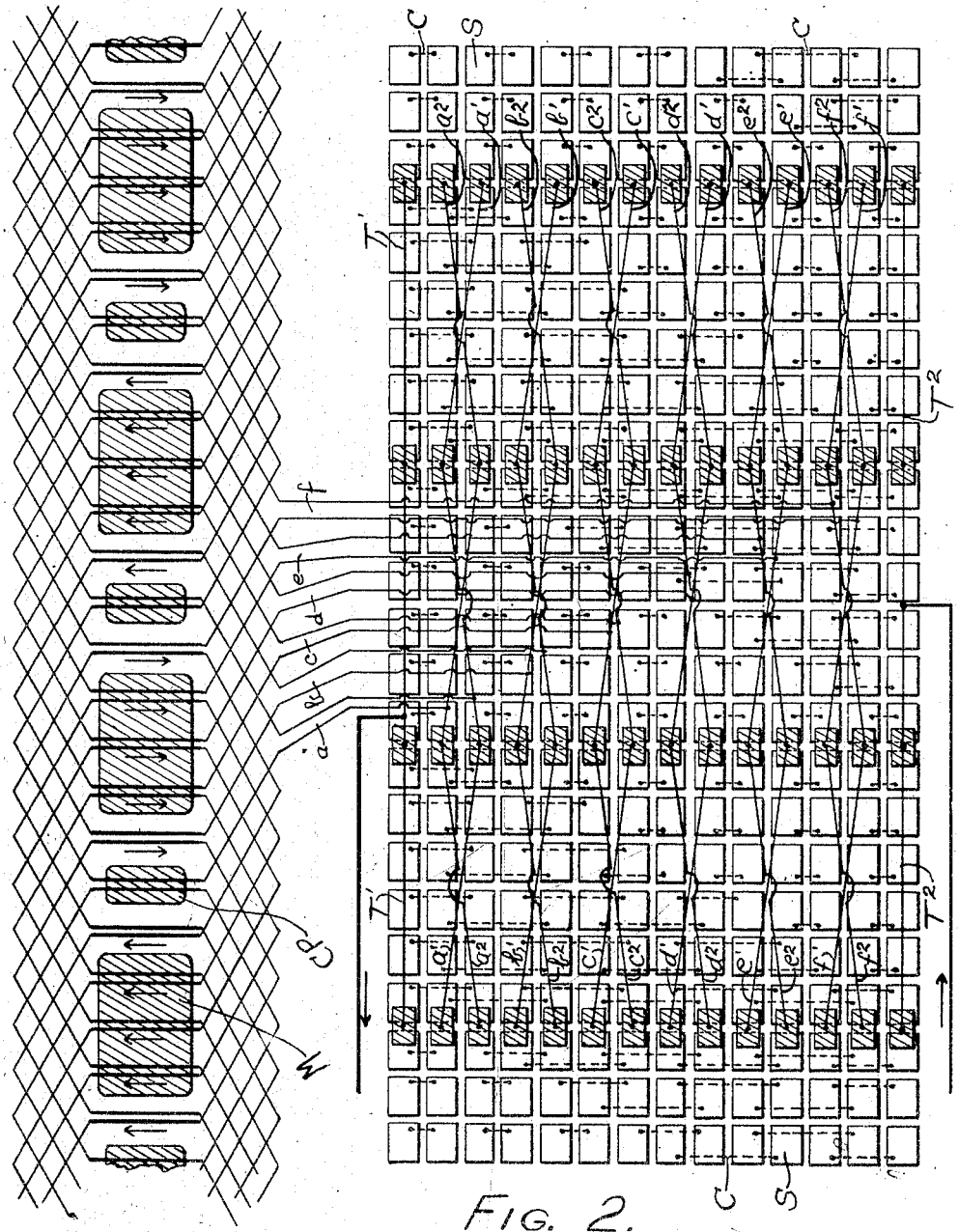

In the accompanying drawings, in which similar reference characters indicate similar parts in each of the views,—Figure 1 is a developed diagrammatic view of a four pole machine having commutating poles, the diagram illustrating a group of six coil units having their terminal brushes in connection with a development of a commutator, therefor, the views showing the use of two rows of brushes connected in a manner whereby there is no difference of potential between the brushes on a circumferential row of segments. Fig. 2 is a similar view showing the use of four rows of brushes and the manner of connecting them, the adjacent brushes on a circumferential row of segments having a difference of potential. Figs. 3 to 6 inclusive are developed diagrammatic views showing a fragment of Figs. 1 and 2, said views illustrating various ways in which commutation may be assisted, the views showing the brushes of one coil unit and the brushes of a terminal of another coil unit, together with the brushes of a group terminal, Fig. 3 showing the arrangement of Figs. 1 and 2 with the brushes indicated as having left the short-circuit condition, Figs. 4 and 5 illustrating ways in which the brushes may be displaced to assist commutation, Fig. 6 showing a way of meeting this condition by the use of pilot brushes. Fig. 7 is a diagrammatic end view of the commutator and brushes employing the disclosure of Fig. 6.

The field magnet poles are indicated at M, and the coil units are indicated at $a$, $b$, $c$, $d$, $e$, and $f$, the commutating poles being indicated at CP. In the drawings I have shown the arrangement as providing a single group, the conductors generating E. M. F.'s of similar time values being connected in series to form the coil units.

The commutator segments are shown at S, being assumed to be properly insulated from each other, while the connections between the segments are indicated by dotted lines, as at C.

The terminals of the coil units are in the form of a connector, the connectors for coil unit $a$ being indicated at $a'$ and $a^2$, those for coil unit $b$ at $b'$ and $b^2$, etc. These connectors in turn are connected to brushes which are adapted to coöperate with circumferential rows of segments in the commutator, the brushes so connected being of similar polarity. For instance, in Fig. 1, the two brushes with which a single circumferential row of segments coöperates are positioned to commutate concurrently and are so located on the row that the connections of the segments on which they operate are similar at all times, the result being that they form divided terminals or terminals in parallel for the coil unit terminal to which they are connected; this permits adjacent connectors, such as $a'$, $a^2$, etc., to extend parallel to each other. By this arrangement, the required brush contact area for the coil unit terminal is distributed between two brushes, thus enabling the use of brushes of smaller size without affecting the general operation.

Fig. 2 shows an arrangement similar to Fig. 1 excepting that two additional rows of brushes are employed, these brushes interspaced between the rows of Fig. 1. The additional rows are positioned to commutate concurrently with the rows of Fig. 1, but the location of these brushes is such that the connections of the segments with which they coöperate are changed with respect to the segments of the brushes of Fig. 1. Adjacent brushes of a coil unit, therefor, which coöperate with a circumferential row of segments have their segment connections in reverse relationship. Consequently adjacent pairs of brushes of a coil unit which coöperate with adjacent circumferential rows of segments have the brushes which coöperate with a single circumferential row opposite in polarity, and since the terminal connectors of a coil unit can be connected only to brushes of similar polarity, such connectors pass from the brush of one circumferential row to the adjacent brush of the same coil unit which coöperates with the adjacent circumferential row of segments.

From the disclosures of Figs. 1 and 2, it will be readily seen that I may employ a row of brushes for each pole of the machine, this particular arrangement being that shown in Fig. 2, the rows of brushes being spaced apart an angular distance equal to the similar distance between corresponding points on successive poles, while in Fig. 1 alternate rows are omitted so that the distance equals that between corresponding parts of similar poles. Obviously, this arrangement may be employed in connection with any multipolar construction the number of rows of brushes connected by connectors such as $a'$, $a^2$, etc., not exceeding the number of poles where the commutator and rotor travel at the same speed; changes in relative speed causing changes in this limit. In other words, the number of rows of brushes which may provide the arrangement disclosed herein may equal but not exceed the number of reversals in connections for any single coil unit. It will be readily understood, however, that the number of rows may be decreased to any desired extent, the minimum limit being two rows, such minimum being that where a bipolar construction is employed; this enables the employment of any desired number of rows within these limits, as for instance, an eight pole structure could employ two, three, four, five, six, seven or eight rows, it being understood that the brushes connected by the connectors are those of similar polarity. One of the principal advantages of this arrangement is that it enables the use of smaller individual brushes thereby permitting the use of a commutator of less length without affecting the diameter. Another feature lies in the fact that the disablement of one brush does not disable the entire machine, the remaining brushes taking up the work under such circumstances. Another feature lies in the fact that a smaller number of groups may be employed, it being possible to employ but a single group thus diminishing the number of leads from the armature. Another advantage of this type of construction lies in the ability to readily provide aids to commutation, some of which are disclosed in Figs. 4 to 7 of the drawings, the arrangements of these figures being now described and more particularly compared with the arrangement of Fig. 3, the latter diagrammatically representing the arrangement shown in Fig. 1, the brushes, however, being shown in a different position in Fig. 3, this position being one in which the brushes are assumed to have been just released from short-circuit. For the purpose of more clearly explaining the arrangement, I have indicated the row of brushes at the left in Fig. 3 as 10, and the row at the right as 15, these brushes being shown as connected to the connectors $a'$, $a^2$, $b'$ and $T'$, the coil units being indicated as $a$ and $b$.

In Fig. 3 the rows of brushes are shown as spaced so as to leave the short-circuit period at the same instant, thus tending to break the short-circuit abruptly.

In Fig. 4, the brushes 10 are shown as located in the same position but in the arrangement of this figure the brushes 15 have been displaced so as to be released from short-circuit after the release of the brushes 10, thus tending to provide a gradual breaking of the short-circuit of the coil unit by reason of decrease of brush contact area in the short-circuit.

In Fig. 5 I have shown an amplification of the arrangement shown in Fig. 4 in that the connectors $a'$, $a^2$ and $b'$ are shown as provided with resistances indicated at $r$, these resistances being located in that portion of the connectors between the brushes 15 and the point of connection of the coil units to the connectors.

Figs. 6 and 7 indicate a slightly different arrangement from the disclosure of Fig. 5 in that the row of brushes 15 is not displaced but additional brushes 20 are positioned to provide the effect of the displaced portion (the heel) of the brushes 15.

These particular arrangements, and more particularly that shown in Fig. 4 is especially applicable where a multiple number of rows of brushes is employed, the rows being preferably displaced in such manner as to provide the equivalent of a step-by-step increasing of resistance in the short-circuit, the last row acting to break the short-circuit. By this arrangement the action is a gradual one, the final breaking being at the time when the short-circuit current has practically been dissipated by the successive breakings at the other rows.

As will be readily understood, the number of groups which may be employed may depend on individual preference or the use to which the machine is to be put, for instance, two groups may be employed with terminals so arranged as to be placed in series or parallel relation, or four groups may be employed with the terminals arranged to be connected in series, parallel-series, or parallel. This latter arrangement is desirable for railway work. For instance, by employing two motors, each having a commutator with two groups with the terminals adapted to be connected up in the manners indicated various running speeds can be provided by connecting all of the groups in series, or in parallel-series, or in straight parallel. This arrangement of four groups is also made advantageous by reason of the fact that the general arrangement would permit of the employment of commutators for each motor, each commutator acting for a single group; if the arrangement for each group be along the lines of Fig. 1, difference of potential between rows of brushes is entirely eliminated. It will be understood, however, that all of the coil units of a machine may be connected into a single group with the various connections arranged as disclosed herein. It will also be understood that the number of windings or coil units employed in a group will not be less than the number required to provide a substantially continuous E. M. F. at the terminals of any one group, the coil units being maintained constantly in series.

While I have herein shown and described several ways in which my invention may be carried into effect, it will be readily understood that changes and modifications therein may be required or desired to meet individual preferences or the exigencies of use and I desire to be understood as reserving the right to make such changes or modifications in so far as the same may fall within the spirit and scope of the invention as expressed in the accompanying claims.

Having thus described my invention, what I claim as new is:—

1. In direct current mechanism, a predetermined number of open-circuit sources of alternating E. M. F., a rotatable commutator for rectifying the current of said sources individually, each terminal of a source coöperating with the commutator at spaced apart points of the commutator, the commutator maintaining said sources in series relationship.

2. In direct current mechanism, a predetermined number of open-circuit sources of alternating E. M. F., a rotatable commutator for rectifying the current of said sources individually, each terminal of a source cooperating with the commutator at spaced apart points of the commutator, the commutator maintaining said sources in series relationship, the source terminal points of cooperation being in parallel relation.

3. In direct current mechanism, a predetermined number of open-circuit sources of alternating E. M. F., a rotatable commutator for rectifying the current of said sources individually, each terminal of a source cooperating with the commutator at spaced apart points of the commutator, the commutator maintaining said sources in series relationship, the source terminal points of cooperation being in parallel relationship independent of the commutator.

4. In direct current mechanism, a predetermined number of open circuit armature coil units, each terminal of a coil unit being in the form of a plurality of brushes connected in parallel, and a commutator for maintaining said sources constantly in series relationship through said brushes, the commutator acting individually on each unit.

5. In direct current mechanism, a predetermined number of open circuit armature coil units, each terminal of a coil unit being in the form of a plurality of brushes connected in parallel, and a commutator for maintaining said sources constantly in series relationship through said brushes, the commutator acting individually on each unit, the points of contact of brushes in parallel being spaced apart on the commutator.

6. In direct current mechanism, a predetermined number of open circuit armature coil units, each terminal of a coil unit being in the form of a plurality of brushes connected in parallel, and a commutator for maintaining said sources constantly in series relationship through said brushes, the commutator acting individually on each unit, the points of contact of brushes in parallel being spaced apart on the commutator circumferentially.

7. In direct current mechanism, a predetermined number of open circuit armature coil units, each terminal of a coil unit being in the form of a plurality of brushes connected in parallel, and a commutator for maintaining said sources constantly in series relationship through said brushes, the commutator acting individually on each unit, the points of contact of brushes in parallel being spaced apart on the commutator, the locations providing substantially concurrent short-circuiting of the coil unit during E. M. F. reversal.

8. In direct current mechanism, a predetermined number of open-circuit sources of alternating E. M. F., a rotatable commutator for rectifying the current of said sources individually and maintaining them in series relationship and in circuit, said rectification including the short-circuiting of the coil unit during its E. M. F. reversal and means for introducing resistance into the short-circuit of said unit as its short-circuiting action progresses.

9. In direct current mechanism, a predetermined number of open-circuit sources of alternating E. M. F., a rotatable commutator for rectifying the current of said sources individually and maintaining them in series relationship and in circuit, said rectification including the short-circuiting of the coil unit during its E. M. F. reversal and means for introducing resistance into the short-circuit of said unit as its short-circuiting action progresses, said means including brushes connected in parallel and acting as a terminal of the unit.

10. In direct current mechanism, a predetermined number of open-circuit sources of alternating E. M. F., a rotatable commutator for rectifying the current of said sources individually and maintaining them in series relationship and in circuit, said rectification including the short-circuiting of the coil unit during its E. M. F. reversal and means for introducing resistance into the short-circuit of said unit as its short-circuiting action progresses, said means including brushes connected in parallel and acting as a terminal of the unit, said brushes being positioned on the commutator to provide overlapping of short-circuit periods.

11. In direct current mechanism, a predetermined number of open-circuit sources of alternating E. M. F., a rotatable commutator for rectifying the current of said sources individually and maintaining them in series relationship and in circuit, said rectification including the short-circuiting of the coil unit during its E. M. F. reversal and means for introducing resistance into the short-circuit of said unit as its short-circuiting action progresses, said means including brushes connected in parallel and acting as a terminal of the unit, said brushes having substantially concurrent short-circuit periods.

12. In direct current mechanism, a predetermined number of open-circuit sources of alternating E. M. F., a rotatable commutator for rectifying the current of said sources individually and maintaining them in series relationship and in circuit, said rectification including the short-circuiting of the coil unit during its E. M. F. reversal and means for introducing resistance into the short-circuit of said unit as its short-circuiting action progresses, said means including brushes connected in parallel and acting as a terminal of the unit, said brushes having substantially concurrent short-circuit periods, one brush completing its period in advance of another brush.

13. In direct current mechanism, a predetermined number of open-circuit sources of alternating E. M. F., a rotatable commutator for rectifying the current of said sources individually and maintaining them in series relationship and in circuit, said rectification including the short-circuiting of the coil during its E. M. F. reversal and means for introducing resistance into the short-circuit of said unit as its short-circuiting action progresses, said means including brushes connected in parallel and acting as a terminal of the unit, said brush connections carrying a resistance element.

14. In direct current mechanism, a predetermined number of open-circuit sources of alternating E. M. F., a rotatable commutator for rectifying the current of said sources individually and maintaining them in series relationship and in circuit, said rectification including the short-circuiting of the coil unit during its E. M. F. reversal and means for introducing resistance into the short-circuit of said unit as its short-circuiting action progresses, said means including brushes connected in parallel and acting as a terminal of the unit, said brushes having substantially concurrent short-circuit periods, one brush completing its period in advance of another brush, said brush connections carrying a resistance element.

In testimony whereof I affix my signature in presence of two witnesses.

CHARLES W. GIRVIN.

Witnesses:
 THEODORE K. BRYANT,
 HORACE G. SEITZ.